US011775226B2

(12) United States Patent
Li et al.

(10) Patent No.: US 11,775,226 B2
(45) Date of Patent: Oct. 3, 2023

(54) METHODS AND DEVICES FOR WRITING DATA INTO A DEGRADED ARRAY USING A PERSISTENT CACHE

(71) Applicant: EMC IP Holding Company LLC, Hopkinton, MA (US)

(72) Inventors: Liam Xiongcheng Li, Beijing (CN); Xinlei Xu, Beijing (CN); Jian Gao, Beijing (CN); Lifeng Yang, Beijing (CN); Yousheng Liu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 95 days.

(21) Appl. No.: 16/167,693

(22) Filed: Oct. 23, 2018

(65) Prior Publication Data

US 2019/0163409 A1 May 30, 2019

(30) Foreign Application Priority Data

Oct. 27, 2017 (CN) .......................... 201711022187.5

(51) Int. Cl.
*G06F 3/00* (2006.01)
*G06F 11/00* (2006.01)
(Continued)

(52) U.S. Cl.
CPC .......... *G06F 3/0689* (2013.01); *G06F 3/0604* (2013.01); *G06F 3/0646* (2013.01);
(Continued)

(58) Field of Classification Search
CPC ............... G06F 3/0689; G06F 11/1076; G06F 11/1084; G06F 12/0866
See application file for complete search history.

(56) References Cited

U.S. PATENT DOCUMENTS 5,533,190 A * 7/1996 Binford ............... G06F 11/1084
714/6.21
5,572,660 A * 11/1996 Jones .................. G06F 11/1076
714/6.12
(Continued)

FOREIGN PATENT DOCUMENTS

CN 105573681 5/2016
CN 106557158 4/2017
(Continued)

OTHER PUBLICATIONS

Gao, Jian, et al.; "Splitting a Group of Physical Data Storage Drives Into Partnership Groups to Limit the Risk of Data Loss During Drive Rebuilds in a Mapped Raid (Redundant Array of Independent Disks) Data Storage System," U.S. Appl. No. 15/497,984, filed Apr. 26, 2017.
(Continued)

*Primary Examiner* — Reginald G Bragdon
*Assistant Examiner* — Michael L Westbrook
(74) *Attorney, Agent, or Firm* — BainwoodHuang

(57) ABSTRACT

Embodiments of the present disclosure relate to methods, devices and computer program products for writing data in a disk array in a storage system. The storage system comprises a disk array. The method comprises: in response to receiving a write request to write new data to a data block in at least one disk array group in a degraded mode within a disk array, reading old data stored in the data block and old parity information stored in a parity block associated with the data block. The method further comprises: determining new parity information associated with the new data based on the old data, the old parity information and the new data. The method further comprises: writing the new data and the new parity information into at least one cache page provided by a cache component in the storage system, the at least one cache page being allocated in a persistent memory in the
(Continued)

cache component. In addition, this method further comprises: flushing the new data and the new parity information into the data block and the parity block in the at least one disk array group, respectively.

12 Claims, 9 Drawing Sheets

(51) Int. Cl.
*G06F 3/06* (2006.01)
*G06F 12/0802* (2016.01)
*G06F 11/10* (2006.01)
*G06F 12/0866* (2016.01)

(52) U.S. Cl.
CPC ...... *G06F 11/1076* (2013.01); *G06F 11/1084* (2013.01); *G06F 12/0802* (2013.01); *G06F 12/0866* (2013.01); *G06F 2212/60* (2013.01)

(56) References Cited

U.S. PATENT DOCUMENTS

| | | | |
|---|---|---|---|
| 5,787,460 A * | 7/1998 | Yashiro | G06F 11/1076 711/113 |
| 5,958,078 A * | 9/1999 | Yamamoto | G06F 11/1076 714/766 |
| 6,012,123 A * | 1/2000 | Pecone | G06F 11/1076 711/111 |
| 6,148,368 A * | 11/2000 | DeKoning | G06F 12/0866 710/53 |
| 8,874,494 B1 | 10/2014 | Evans | |
| 9,354,975 B2 | 5/2016 | Aliev et al. | |
| 9,690,660 B1 | 6/2017 | Robins et al. | |
| 9,804,939 B1 | 10/2017 | Bono et al. | |
| 9,891,989 B2 * | 2/2018 | Kawamura | G06F 3/0619 |
| 9,921,912 B1 | 3/2018 | Vankamamidi et al. | |
| 10,013,323 B1 | 7/2018 | Puhov et al. | |
| 10,146,459 B1 | 12/2018 | Gao et al. | |
| 10,146,624 B1 | 12/2018 | Gong et al. | |
| 10,152,254 B1 | 12/2018 | Kang et al. | |
| 10,210,045 B1 | 2/2019 | Gao et al. | |
| 10,289,336 B1 | 5/2019 | Liu et al. | |
| 10,365,845 B1 | 7/2019 | Foley et al. | |
| 10,365,983 B1 | 7/2019 | Foley et al. | |
| 10,445,013 B2 | 10/2019 | Lei et al. | |
| 10,459,814 B2 | 10/2019 | Gao et al. | |
| 10,496,482 B1 | 12/2019 | Foley et al. | |
| 2001/0049799 A1 * | 12/2001 | Morita | G06F 11/1008 714/6.22 |
| 2002/0007438 A1 * | 1/2002 | Lee | G06F 11/1076 711/114 |
| 2002/0161970 A1 * | 10/2002 | Busser | G06F 11/1076 711/114 |
| 2007/0124407 A1 * | 5/2007 | Weber | G06F 3/0607 709/212 |
| 2008/0183963 A1 * | 7/2008 | He | G06F 11/1092 711/114 |
| 2013/0219248 A1 * | 8/2013 | Sakurai | G06F 11/1084 714/766 |
| 2014/0365725 A1 * | 12/2014 | Barrell | G06F 11/1076 711/113 |
| 2015/0324294 A1 * | 11/2015 | Ogawa | G06F 12/0871 711/118 |
| 2018/0032433 A1 * | 2/2018 | Ito | G06F 13/10 |
| 2018/0095824 A1 * | 4/2018 | Agombar | G06F 11/1076 |
| 2019/0012270 A1 * | 1/2019 | Imazaki | G06F 12/0804 |
| 2019/0082010 A1 * | 3/2019 | Friedman | G06F 11/1076 |

FOREIGN PATENT DOCUMENTS

| | | | | |
|---|---|---|---|---|
| EP | 0802485 A1 * | 10/1997 | ......... | G06F 11/1076 |
| EP | 1770492 A2 * | 4/2007 | ......... | G06F 3/0613 |

OTHER PUBLICATIONS

Dalmatov, Nickolay; "Re-Placing Data Within a Mapped-Raid Environment," U.S. Appl. No. 16/078,360, filed Aug. 21, 2018.

* cited by examiner

METHODS AND DEVICES FOR WRITING DATA INTO A DEGRADED ARRAY USING A PERSISTENT CACHE

RELATED APPLICATIONS

This application claim priority from Chinese Patent Application Number CN 201711022187.5, filed on Oct. 27, 2017 at the State Intellectual Property Office, China, titled "METHOD AND APPARATUS FOR WRITING DATA TO A DISK ARRAY IN A STORAGE SYSTEM" the contents of which is herein incorporated by reference in its entirety.

FIELD

Embodiments of the present disclosure generally relate to the field of data storage, and specifically to methods, devices and computer program products for writing data in a disk array in a storage system.

BACKGROUND

A storage system usually has a plurality of storage disks which may be organized in a disk array. For example, Redundant Arrays of Independent Disks (RAID) is a kind of data storage virtualization technology, and combines a plurality of storage disks into a single logic unit for the sake of data redundancy backup and/or performance improvement. Take RAID5 as an example. A RAID group (RG) may be comprised of block-level stripes of distributed parity information. When a single disk in the disk array malfunctions, subsequent read can be calculated by the distributed parity information, so that no data is lost. Meanwhile, a standby disk is selected to replace the malfunction disk, and all data on the malfunction disk will be rebuilt and written on the standby disk. Before the rebuilding process is completed, the disk array group will be in a degraded mode.

However, during rebuilding, the storage system might still receive an I/O request which is from an upper-layer application and with respect to the disk array group in the degraded mode. When a write request with respect to the disk array group in the degraded mode arrives, it is necessary to avoid data inconsistency due to write failure.

SUMMARY

Embodiments of the present disclosure provide methods, devices and computer program products for writing data in a disk array in a storage system.

According to a first aspect of the present disclosure, there is provided a method of writing data in a disk array in a storage system. The method comprises: in response to receiving a write request to write new data to a data block in at least one disk array group in a degraded mode within a disk array, reading old data stored in the data block and old parity information stored in a parity block associated with the data block. The method further comprises: determining new parity information associated with the new data based on the old data, the old parity information and the new data. The method further comprises: writing the new data and the new parity information into at least one cache page provided by a cache component in the storage system, the at least one cache page being allocated in a persistent memory in the cache component. In addition, this method further comprises: flushing the new data and the new parity information into the data block and the parity block in the at least one disk array group, respectively.

According to a second aspect of the present disclosure, there is provided a method of writing data in a disk array in a storage system. The method comprises: in response to receiving from a disk array a first request to allocate at least one cache page for caching to-be-written data, allocating the at least one cache page in a persistent memory in a cache component of a storage system, the to-be-written data being to be written into at least one storage block in at least one disk array group in a degraded mode within a disk array. The method further comprises: sending first information about the at least one cache page to the disk array. The method further comprises: in response to receiving from the disk array a first indication that the to-be-written data has been written into the at least one cache page, marking the at least one cache page as to-be-flushed. In addition, the method further comprises: sending to the disk array a second indication that the to-be-written data can be flushed to the at least one disk array group, so that the to-be-written data in the at least one cache page marked as to-be-flushed is flushed into the at least one storage block.

According to a third aspect of the present disclosure, there is provided a disk array comprised in a storage system. The disk array comprises at least one processing unit and at least one memory. The at least one memory is coupled to the at least one processing unit, and stores instructions executable by the at least one processing unit. The instructions, when executed by the at least one processing unit, causes a device to perform acts comprising: in response to receiving a write request to write new data to a data block in at least one disk array group in a degraded mode within a disk array, reading old data stored in the data block and old parity information stored in a parity block associated with the data block; determining new parity information associated with the new data based on the old data, the old parity information and the new data; writing the new data and the new parity information into at least one cache page provided by a cache component in the storage system, the at least one cache page being allocated in a persistent memory in the cache component; flushing the new data and the new parity information into the data block and the parity block in the at least one disk array group, respectively.

According to a fourth aspect of the present disclosure, there is provided a cache component which is included in a storage system. The disk array comprises at least one processing unit and at least one memory. The at least one memory is coupled to the at least one processing unit, and stores instructions executable by the at least one processing unit. The instructions, when executed by the at least one processing unit, causes a device to perform acts comprising: in response to receiving from a disk array a first request to allocate at least one cache page for caching to-be-written data, allocating the at least one cache page in a persistent memory in a cache component of a storage system, the to-be-written data being to be written into at least one storage block in at least one disk array group in a degraded mode within a disk array; sending first information about the at least one cache page to the disk array; in response to receiving from the disk array a first indication that the to-be-written data has been written into the at least one cache page, marking the at least one cache page as to-be-flushed; and sending to the disk array a second indication that the to-be-written data can be flushed to at least one disk array group, so that the to-be-written data in the at least one cache page marked as to-be-flushed is flushed into the at least one storage block.

According to a fifth aspect of the present disclosure, there is provided a computer program product being tangibly stored on a non-transient computer storage medium and comprises machine-executable instructions. The machine-executable instructions, when executed by a device, cause the device to perform any step of the method described according to the first aspect of the present disclosure.

According to a sixth aspect of the present disclosure, there is provided a computer program product being tangibly stored on a non-transient computer storage medium and comprises machine-executable instructions. The machine-executable instructions, when executed by a device, cause the device to perform any step of the method described according to the second aspect of the present disclosure.

This Summary is provided to introduce a selection of concepts in a simplified form that will be further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent from the following detailed description with reference to the accompanying drawings, in which the same reference symbols generally refer to the same elements.

In all figures, the same or corresponding reference numbers denote the same or corresponding parts.

DETAILED DESCRIPTION OF EMBODIMENTS

Figure 1A:
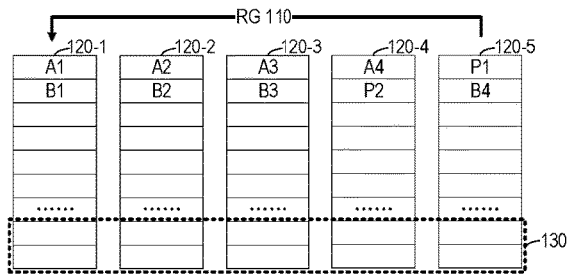
FIGS. 1A-1E illustrate schematic diagrams of performing a write operation with respect to a disk array group in a degraded mode in a conventional scheme.

Preferred embodiments of the present disclosure will be described as follows in greater detail with reference to the drawings. Although preferred embodiments of the present disclosure are illustrated in the drawings, it is to be understood that the present disclosure described herein can be implemented in various manners, not limited to the embodiments illustrated herein. Rather, these embodiments are provided to make the present disclosure described herein more thorough and complete, and completely convey the scope of the present disclosure described herein to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "an example embodiment" are to be read as "at least one example embodiment." The term "another embodiment" is to be read as "at least one other embodiment." Terms "first", "second" and the like can denote different or identical objects. The following text may also contain other explicit or implicit definitions.

To facilitate illustration, RAID 5 is taken as an example of disk array below. However, it should be appreciated that this is only intended to facilitate illustration, and does not imply any limitations of the scope of the present disclosure.

As stated above, when a certain disk in the disk array group malfunctions, a standby disk is usually used to rebuild the malfunction disk. During the rebuilding, the disk array group in the degraded mode is still possible to receive an I/O request from an upper-layer application. When a write request with respect to the disk array group in the degraded mode arrives, in order to avoid data inconsistency due to write failure, before new data is written into a specific stripe in the disk array group, it is usual to firstly write new data and calculated new parity information into an independent journal space on the storage disk. Then, write the new data and new parity information into a specific position of a specific stripe to avoid data inconsistency due to write failure (e.g., new data is already written and new parity information is not yet written). After successful writing, user data and parity data in the journal space will be removed.

FIGS. 1A-1E illustrate schematic diagrams of performing a write operation with respect to a RG 110 in a degraded mode in a conventional scheme. As shown in FIG. 1A, RG 110 uses five disks, namely, disk 120-1, disk 120-2, ... disk 120-5 (collectively called as disk 120). Each stripe in RG 110 (namely, each row in RG 110) for example may include four data blocks and one parity block (hereinafter also referred to as "4D+1P" RAID 5). The "data blocks" here refer to storage blocks for storing user data A1-A4, B1-B4 and so on, and furthermore, "parity block" refers to a storage block storing parity information P1, P2 and so on. In addition, an independent journal space is allocated on the disk 120 to ensure data consistency upon performing read/write operation with respect to RG 110.

Figure 1B:
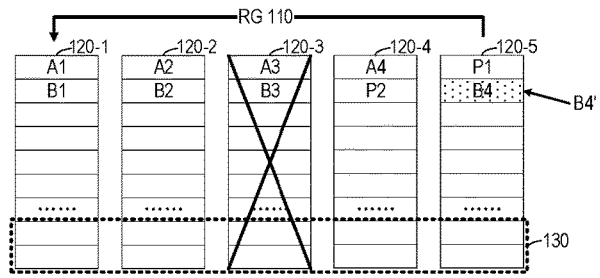

As shown in FIG. 1B, for example, disk 120-3 in RG 110 malfunctions. In this case, all data on the malfunction disk 120-3 will be rebuilt and written into a standby disk (not shown). Before completion of the rebuilding process, RG 110 is in the degraded mode. At this time, RG 110 still receives a write request from the upper-layer application. For example, the upper-layer application request writes user data B4' into the data block where B4 is located.

Figure 1C:
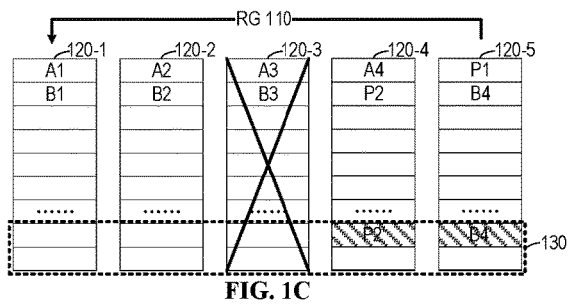

As shown in FIG. 1C, in order to ensure data consistency of the write process, the to-be-written data is first written into the journal space 130. For example, the data written into the journal space 130 includes user data B4', and new parity information P2' obtained by calculating based on new user data B4' (for example, the new parity information P2' may be calculated based on the user data B4, the parity information P2 and the new user data B4').

Figure 1D:
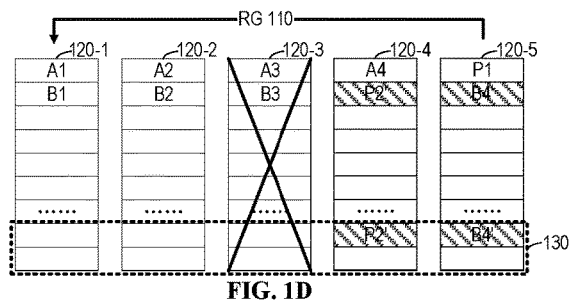

Upon completion of the write journal operation, as shown in FIG. 1D, the new user data B4' and the new parity information P2' are respectively copied from the journal space 130 into the corresponding data block and parity block.

Figure 1E:
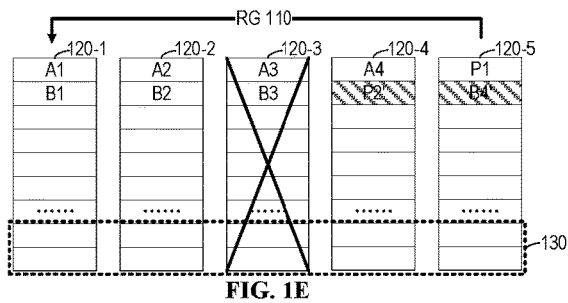

After the write with respect to RG 110 is completed successfully, as shown in FIG. 1E, the user data B4' and the parity information P2' in the journal space 130 are removed.

It can be seen that, although the above process can ensure data consistency of the write operation with respect to the disk array group in the degraded mode, the above process apparently increases the number of times of reading/writing the storage disk, thereby increasing the response time of the write operation. In addition, when the disk array is built by using a flash memory drive, the above process prominently shortens a life cycle of the flash memory drive.

An example embodiment of the present disclosure provides a scheme of writing data into the disk array in the storage system. This scheme uses persistent memory service provided by a high-speed cache component to replace a journal writing procedure in a conventional scheme. This scheme can reduce the number of times of reading/writing the storage disk while ensuring data consistency during the write operation, thereby reducing the response time of the write operation with respect to the disk array group in the degraded mode. This scheme can prominently improve an overall throughput while the disk array group is in the degraded mode. In addition, when the storage disk in the disk array is a flash memory drive or solid-state disk, the scheme can substantially reduce wear degree of the storage disk and thereby prolong the service life of the storage disk.

Figure 2:
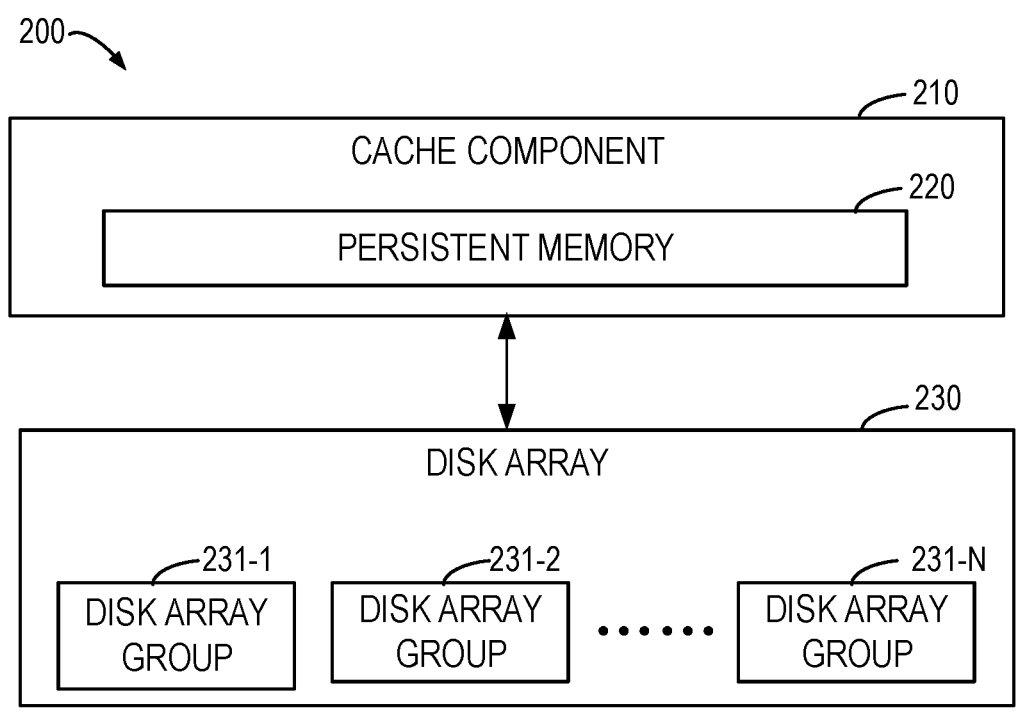
FIG. 2 illustrates a diagram of an architecture of a storage system 200 according to an embodiment of the present disclosure.

FIG. 2 illustrates a diagram of an architecture of a storage system 200 according to an embodiment of the present disclosure. As shown in FIG. 2, the storage system 200 may comprise a cache component 210 and a disk array 230. It should be appreciated that the structure and function of the storage system 200 shown in FIG. 2 are only intended for illustration purpose, and do not imply any limitations of the scope of the present disclosure. Embodiments of the present disclosure may be embodied in different structures and/or functions.

The cache component 210 may be used to store frequently-accessed data in a high-speed storage medium so as to quickly respond to the I/O request with respect to these data. In some embodiments, the cache component 210 may include a persistent memory 220, which may include any persistent storage medium that is currently known or to be developed. In virtual page-type storage, caching and data substitution between storage disks are performed with a page as a unit (e.g., the size of the page may correspond to the size of the storage block on the storage disk). In some embodiments, the cache component 210 may cache data in one or more cache pages allocated on the persistent memory 220.

In addition, the cache component 210 may further include a battery (not shown) to provide power failure protection for the cached data. For example, when the power source of the system fails, the cache component 210 may use the battery to write one or more cache pages into a standby disk. Upon recovery of the power failure, the cache component 210 may reload one or more cache pages in the persistent memory 220.

The disk array 230 may comprise a plurality of storage disks, which may be divided into a plurality of disk array groups 231-1, 231-2, . . . 231-N (collectively called as disk array group 231). The "storage disk" stated here may refer to any non-volatile storage medium that is currently known or to be developed in the future, for example, magnetic disk, optical disk or solid-state disk (SSD), or the like. The disk array 230 for example may be RAID, and it may have different levels according to levels of required redundancy and performance, for example, RAID 0, RAID 1, . . . RAID 5, etc. To facilitate illustration, RAID 5 is taken as an example of disk array 230 below.

When the storage system 200 receives the I/O request from the upper-layer application, the I/O request is firstly sent to the cache component 210 to determine whether the requested data is already cached in the cache component 210. When the requested data is already cached (also called "cache-hit"), the storage system 200 may obtain the requested data from the cache component 210, as a response to the I/O request. When the requested data is not cached (also called "cache-not-hit"), the I/O request is sent via the cache component 210 to the disk array 230, to obtain the requested data from the disk array 230.

In addition, to ensure data consistency, the data cached in the cache component 210 may be flushed into the disk array 230 at a proper time. In the following depictions, the data or cache page that is cached in the cache component 210 and not yet submitted to the disk array 230 is also called "dirty data" or "dirty page."

When a disk in the disk array group (e.g., disk array group 231-1) malfunctions, the rebuilding process with respect to the disk array group 231-1 may happen, so as to use the standby disk to rebuild the malfunction disk. During rebuilding, the disk array group 231-1 in the degraded mode still possibly receives the I/O request from the upper-layer application. When the write request with respect to the disk array group in the degraded mode arrives, the persistent memory 220 provided by the cache component 210 may be used to replace the journal space 130 as shown in FIG. 1, to ensure data consistency of the write operation. For example, before the new data is written into a specific stripe in the disk array group 231-1, it is possible to firstly write the new data and calculated new parity information into the persistent memory 220, and then flush the new data and the new parity information in a specific position of the specific stripe in the disk array group 231-1.

Figure 3:
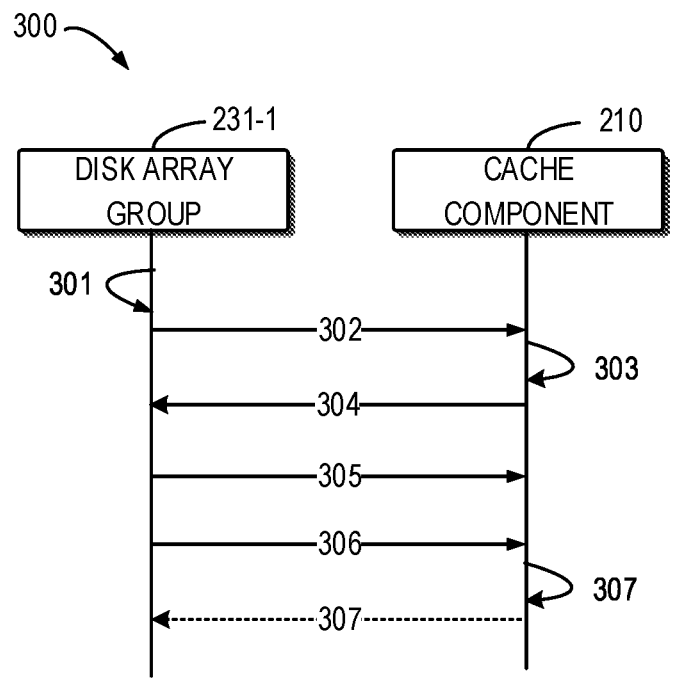
FIG. 3 illustrates a schematic diagram of a process 300 of writing to-be-written data in the disk array group in the degraded mode into a cache component according to an embodiment of the present disclosure.

FIG. 3 illustrates a schematic diagram of a process 300 of writing to-be-written data in the disk array group in the degraded mode into a cache component according to an embodiment of the present disclosure. For purpose of illustration, FIG. 3 only shows the disk array group 231-1 in the degraded mode and the cache component 210. In addition, the RG 110 as shown in FIG. 1A is taken as an example of the disk array group 231-1. For example, the disk array group 231-1 is an RG of 4D+1P RAID 5, and it uses five disks 120-1, 120-2, . . . 120-5, wherein the disk 120-3 malfunctions, and the upper-layer application request writes the user data B4' into the data block where B4 is located.

In response to receiving the write request, the disk array group 231-1 reads old data B4 and old parity information P2 in the stripe where B4 is located, and determines (301) new parity information P2' associated with the new data B4' based on the old data B4, the old parity information P2 and the new data B4'.

Figure 4:
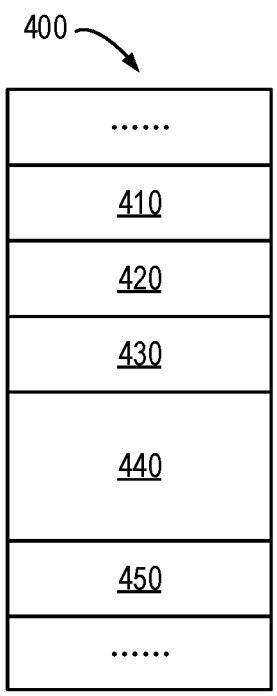
FIG. 4 illustrates a schematic diagram of a first request sent by the disk array to the cache component according to embodiments of the present disclosure.

The disk array group 231-1 sends (302) a request (also called "a first request" below) to the cache component 210 to allocate, in the persistent memory 220, at least one cache page for caching the new data B4' and the new parity information P2'. FIG. 4 illustrates a schematic diagram of a first request according to embodiments of the present disclosure. For example, FIG. 4 exemplarily shows partial fields included in a first request 400 sent by the disk array group 231-1 to the cache component 210.

To ensure data consistency, the write operation with respect to the disk array group in the degraded mode must be completed in a transactional manner. That is, when the write operation is going on, other writes or flushes with respect to the same stripe in the disk array group should not be permitted. To this end, as shown in FIG. 4, the first request 400 may include fields 410 and 420. For example, the field 410 may identify address information (e.g., a start logic block address LBA) of the stripe to be locked, and the field 420 may identify the number of storage blocks in the locked stripe. In some embodiments, the write operation might involve one or more storage blocks in the stripe. To this end, as shown in FIG. 4, the first request 400 may include a field 430 and one or more fields 440. For example, the field 430 may identify the number of storage blocks in one or more storage blocks involved by the write operation, and each field of the one or more fields 440 may identify address information (e.g., a start logic block address LBA) of the corresponding storage blocks in the one or more storage blocks. In some embodiments, as shown in FIG. 1A, since a parity block where the parity information P2 is located is not on the malfunction disk 120-3, the write operation will involve the parity block in the stripe. In some other embodiments, if the parity block to be written into the stripe is located on the malfunction disk, the parity information does not need to be updated, and therefore the write operation may not involve the parity block. To indicate this information, the first request 400 may further include a field 450, which indicates whether the write operation involves the parity block in the stripe. For example, if the parity block is not on the malfunction disk, the field 450 may indicate that the write operation involves the parity block in the stripe; otherwise the field 450 may indicate that the write operation does not involve the parity block in the stripe.

Returning to FIG. 3, in response to receiving the first request from the disk array group 231-1, the cache component 210 allocates (303), in the persistent memory, at least one cache page for caching the new data B4' and the new parity information P2'. In some embodiments, a corresponding cache page may be allocated with respect to each storage block to be cached. For example, the cache component 210 may allocate two cache pages for caching the new data B4' and the new parity information P2' respectively. The addresses of these cache pages may be recorded in one or more lists (called "scatter gather list", SGL), and the cache component 210 may send (304) information (hereinafter referred to as "first information") including these lists to the disk array group 231-1.

In response to receiving the first information from the cache component 210, the disk array group 231-1 may write (305) the new data B4' and the new parity information P2' into the at least one allocated cache page. When the write is completed, the disk array group 231-1 may send (306) to the cache component 210 an indication (hereinafter referred to as "a first indication") of completion of the write. In some embodiments, the first indication may instruct the cache component 210 to lock the corresponding stripe to stop a further operation for that stripe, and the first request may further instruct the cache component 210 to mark at least one cache page as to-be-flushed.

In response to receiving the first indication from the disk array group 231-1, the cache component 210 may lock (307) the corresponding stripe to prevent a further operation for that stripe, and mark at least one cache page caching the new data B4' and the new parity information P2' as to-be-flushed. In addition, or as an alternative, the cache component 210 may send (308), to the disk array group 231-1, a second indication that the to-be-written data can be flushed to the disk array group 231-1, so that the to-be-written data in the at least one cache page marked as to-be-flushed is flushed into the corresponding storage block.

Figure 5:
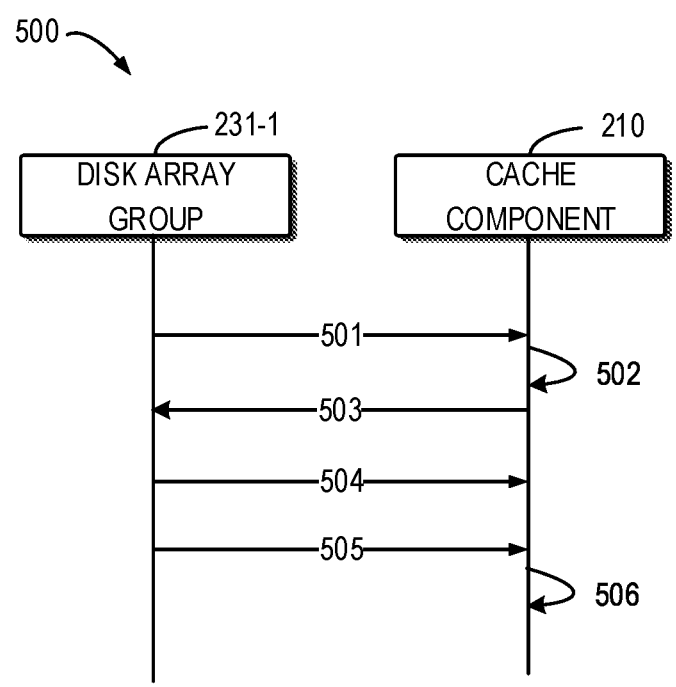
FIG. 5 illustrates a schematic diagram of a process 500 of flushing to-be-written data from the cache component into the disk array group according to embodiments of the present disclosure.

FIG. 5 illustrates a schematic diagram of a process 500 of flushing to-be-written data from the cache component 210 into the disk array group 231-1 according to embodiments of the present disclosure.

Figure 6:
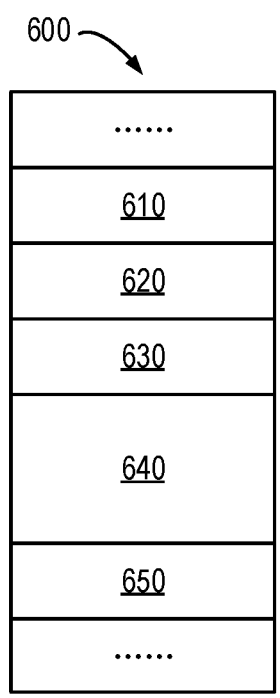
FIG. 6 illustrates a schematic diagram of a second request sent by the disk array to the cache component according to embodiments of the present disclosure.

As shown in FIG. 5, the disk array group 231-1 may send (501), to the cache component 210, a request (hereinafter referred to as "a second request") for flushing the new data B4' and the new parity information P2'. In some embodiments, the disk array group 231-1 may send the second request to the cache component 210 in response to receiving the above-described second indication. FIG. 6 illustrates a schematic diagram of a second request according to embodiments of the present disclosure. For example, FIG. 6 exemplarily shows partial fields included in the second request 600 sent by the disk array group 231-1 to the cache component 210.

As shown in FIG. 6, the second request 600 may include fields 610 and 620. For example, the field 610 may identify address information (e.g., a start logic block address LBA) of the stripe to be unlocked, and the field 620 may identify the number of storage blocks in the stripe to be unlocked. In some embodiments, the write operation may involve one or more storage blocks in the stripe. To this end, as shown in FIG. 6, the second request 600 may include a field 630 and one or more fields 640. For example, the field 630 may identify the number of storage blocks in the one or more storage blocks to be flushed, and each field of the one or more fields 640 may identify address information (e.g., a start logic block address LBA) of corresponding storage blocks in the one or more storage blocks. Corresponding to the first request, in some embodiments, the second request 600 may further include a field 650, which indicates whether to flush the parity block in the stripe. For example, if the parity block is not on the malfunction disk, the field 650 may indicate that the parity block is to be flushed; otherwise, the field 650 may indicate that the parity block is not to be flushed.

Returning to FIG. 5, in response to receiving the second request from the disk array group 231-1, the cache component 210 determines (502) information (hereinafter referred to as "second information") of at least one cache page marked as to-be-flushed. To ensure data consistency, one or more cache pages, which are associated with the same stripe and to be flushed, must be flushed into a corresponding storage block at one time. Hence, the cache component 210 needs to collect all to-be-flushed cache pages associated with the same stripe, and include addresses of these cache pages in one or more lists (e.g., SLG). The cache component 210 may send (503) a write-through request including information of these lists (hereinafter referred to as "second information") to the disk array group 231-1.

In response to receiving the write-through request from the cache component 210, the disk array group 231-1 may flush (504) the cache page indicated in the second information into a corresponding storage block. That is to say, the disk array group 231-1 may flush the new data B4' and the new parity information P2' respectively to corresponding data block and parity block. In response to completion of the flush, the disk array group 231-1 may send (505), to the cache component 210, an indication (hereinafter referred to as "a third indication") of completion of the flush.

In response to receiving the third indication from the disk array group 231-1, the cache component 210 may release (506) the allocated cache page, and unlock the corresponding stripe to enable a further operation for the stripe.

It can be seen from the above depictions that according to the embodiment of the present disclosure, the persistent memory service provided by a cache component can be used to replace a journal space allocated on the storage disk in a conventional scheme. As compared with the conventional scheme as shown in FIG. 1, this scheme can reduce the number of times of reading/writing the storage disk while ensuring data consistency during the write operation, thereby reducing the response time of the write operation with respect to the disk array group in the degraded mode. This scheme can prominently improve an overall throughput while the disk array group is in the degraded mode. In addition, when the storage disk in the disk array is a flash memory drive or solid-state disk, the scheme can substantially reduce wear degree of the storage disk and thereby prolong the service life of the storage disk.

In some embodiments, before the to-be-flushed cache page is successfully flushed to the storage disk, data in the to-be-flushed cache page may be protected by the persistent memory 220 in the cache component 210. If the to-be-flushed cache page is not successfully flushed into the storage disk, the cache component 210 may re-attempt to flush the to-be-flushed cache page into the storage disk.

In addition, as described above, the cache component 210 may further comprise a battery to provide power failure protection for the cached data. For example, when the power source of the system fails, the cache component 210 may use the battery to write the to-be-flushed cache page into a standby disk. Upon recovery of the power failure, the cache component 210 may firstly reload the to-be-flushed cache page into the persistent memory 220, and then attempt to flush the dirty page into the storage disk.

Figure 7:
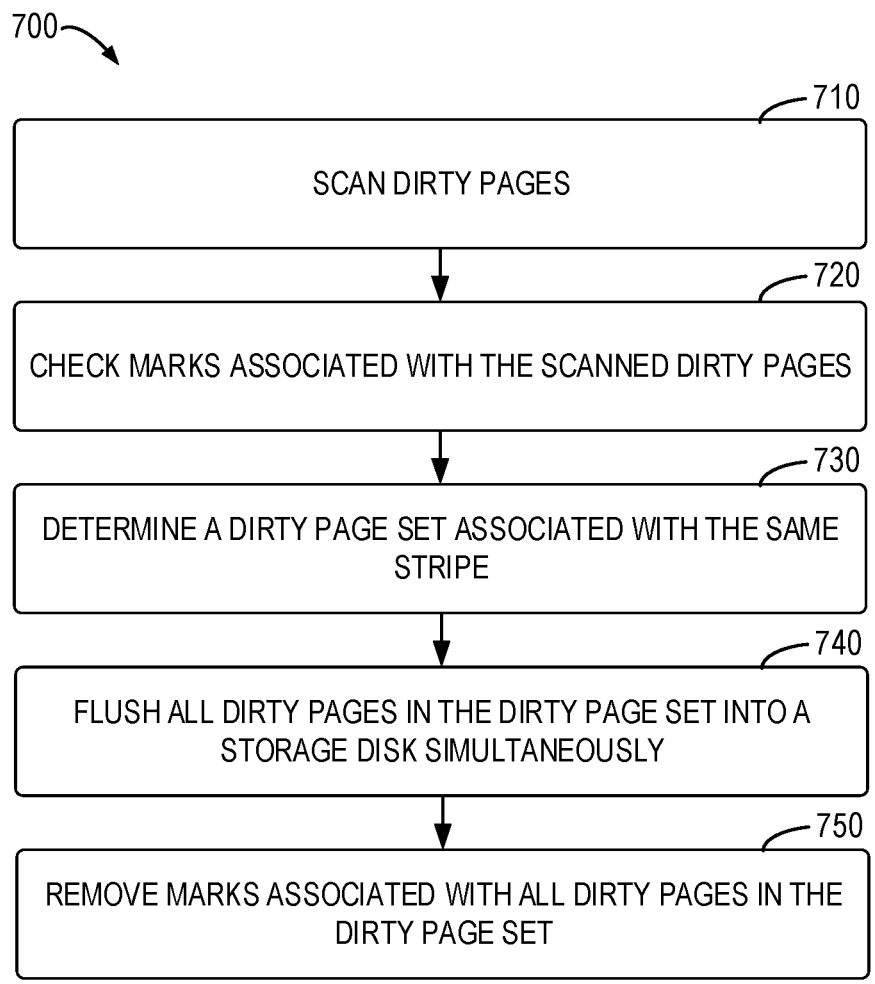
FIG. 7 illustrates a schematic diagram of a process 700 of the cache component flushing a dirty page according to embodiments of the present disclosure.

The above flushing process is similar to that as shown in FIG. 5, with the difference lies in that the flushing process is initiated by the cache component 210 instead of the disk array 230. FIG. 7 illustrates a schematic diagram of a process 700 of the cache component 210 flushing a dirty page according to embodiments of the present disclosure. For example, the process 700 may be executed by the cache component 210 when the third indication is not received or when the power failure of the system recovers.

As shown in FIG. 7, the cache component 210 scans (710) one or more dirty pages. For the scanned one or more dirty pages, the cache component 210 checks (720) marks associated with the one or more dirty pages, for example, a locking mark and/or to-be-flushed mark as stated above. Then, the cache component 210 determines (730) a dirty page set associated with the same stripe. The cache component 210 may flush (740) all dirty pages in the dirty page set associated with the same stripe into the stripe simultaneously, so as to avoid data inconsistency. Then, the cache component 210 may remove (750) marks associated with all dirty pages in the dirty page set, including the locking mark and/or to-be-flushed mark.

In this manner, the embodiment of the present disclosure can ensure data consistency when malfunction occurs. In addition, it is possible to improve the storage system performance while ensuring data consistency, by using the persistent memory service provided by the high-speed cache component to replace the journal writing space in the conventional scheme.

Figure 8:
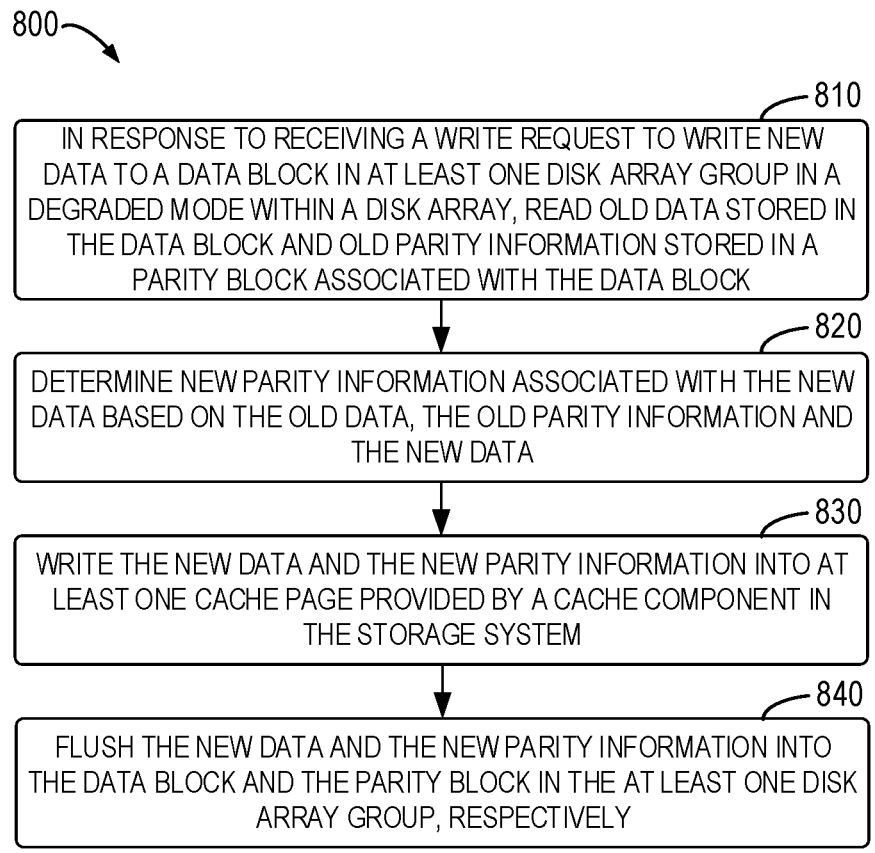
FIG. 8 illustrates a flowchart of a method 800 for writing data into the disk array in the storage system according to embodiments of the present disclosure.

FIG. 8 illustrates a flowchart of a method 800 for writing data into the disk array in the storage system according to embodiments of the present disclosure. For example, the method 800 may be executed by the disk array 230 as shown in FIG. 2. It should be appreciated that the method may further include additional steps not shown and/or the shown steps may be omitted, and the scope of the present disclosure is not limited in this regard.

At block 810, in response to receiving a write request to write new data to a data block in at least one disk array group in the degraded mode in the disk array, old data stored in the data block and old parity information stored in a parity block associated with the data block are read.

At block 820, new parity information associated with the new data is determined based on the old data, the old parity information and the new data.

At block 830, the new data and the new parity information are wrote into at least one cache page provided by a cache component in the storage system, the at least one cache page being allocated in a persistent memory in the cache component.

At block 840, the new data and the new parity information are flushed into the data block and the parity block in the at least one disk array group, respectively.

In some embodiments, writing the new data and the new parity information into at least one cache page provided by a cache component in the storage system comprises: sending a first request to the cache component to allocate at least one cache page in the persistent memory; in response to receiving first information about the at least one cache page from the cache component, writing the new data and the new parity information into the at least one cache page; and in response to completion of the writing to the at least one cache page, sending a first indication of the completion of the writing to the cache component.

In some embodiments, the data block and the parity block are included in a stripe in at least one disk array group. The first request instructs the cache component to lock the strip to prevent a further operation for the stripe, and the first request further instructs the cache component to mark the at least one cache page as to-be-flushed upon receiving the first indication.

In some embodiments, the first information about the at least one cache page comprises a data structure recording the address of the at least one cache page.

In some embodiments, writing the new data and the new parity information into the at least one cache page comprises: in response to receiving, from the cache component, a second indication that the new data and the new parity information can be flushed to at least one disk array group, sending to the cache component a second request to flush the new data and the new parity information; in response to receiving from the cache component a write-through request with respect to the new data and the new parity information, flushing the new data and the new parity information into the data block and the parity block, respectively; and in response to completion of flushing to the data block and the parity block, sending a third indication about the completion of the flushing to the cache component.

In some embodiments, the write-through request comprises second information of the at least one cache page marked by the cache component as to-be-flushed.

In some embodiments, the second request instructs the cache component to release the at least one cache page and unlock the stripe upon receiving the third indication so as to enable a further operation for the stripe.

Figure 9:
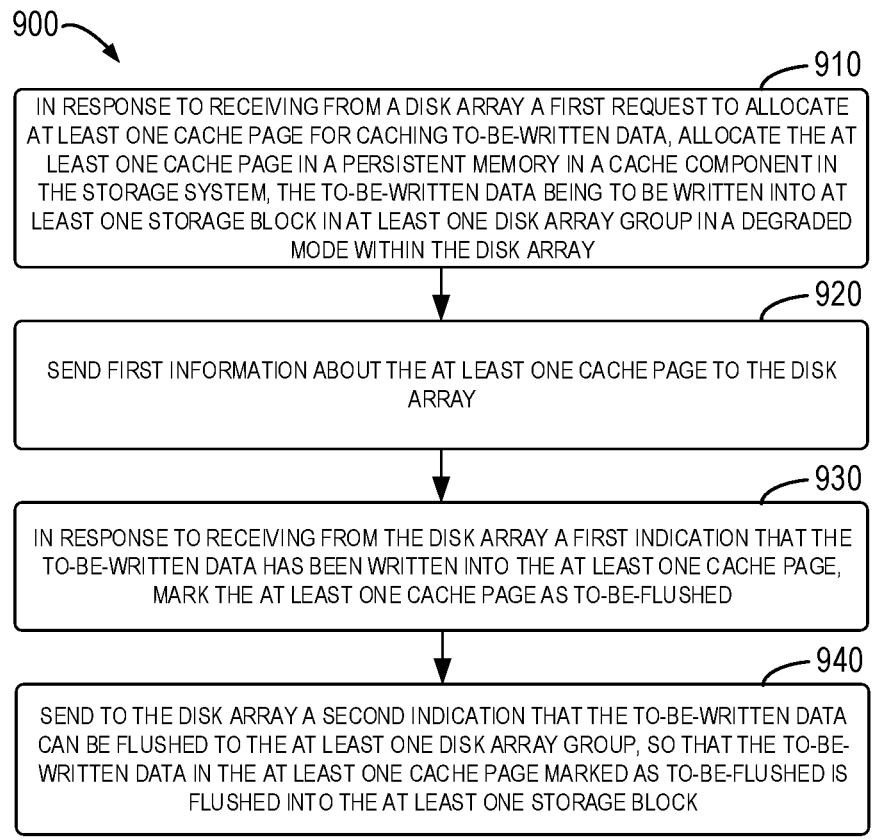
FIG. 9 illustrates a flowchart of a method 900 for writing data into the disk array in the storage system according to embodiments of the present disclosure.

FIG. 9 illustrates a flowchart of a method 900 for writing data into the disk array in the storage system according to embodiments of the present disclosure. For example, the method 900 may be executed by the disk array 210 as shown in FIG. 2. It should be appreciated that the method 900 may further include additional steps not shown and/or the shown steps may be omitted, and the scope of the present disclosure is not limited in this regard.

At block 910, in response to receiving from the disk array a first request for allocating at least one cache page caching to-be-written data, the at least one cache page is allocated in a persistent memory in a cache component of the storage system, the to-be-written data being to be written into at least one storage block in at least one disk array group in a degraded mode within the disk array.

At block 920, first information about the at least one cache page is sent to the disk array.

At block 930, in response to receiving from the disk array a first indication that the to-be-written data has been written into the at least one cache page, the at least one cache page is marked as to-be-flushed.

At block 940, a second indication that the to-be-written data can be flushed to the at least one disk array group is sent to the disk array, so that the to-be-written data in the at least one cache page marked as to-be-flushed is flushed into the at least one storage block.

In addition, or as an alternative, in some embodiments, the method 900 further comprises: in response to receiving from the disk array a second request to flush the to-be-written data, determining second information about the at least one cache page marked as to-be-flushed; and sending a write-through request for to-be-written data to the disk array, so that the to-be-written data is flushed into the at least one storage block, the write-through request comprising the second information.

In addition, or as an alternative, in some embodiments, the at least one storage block is included in a stripe in the at least one disk array group. The method 900 may further comprise: in response to receiving the first request, locking the stripe to prevent a further operation for the stripe; and in response to receiving from the disk array a third indication that the to-be-written data has been flushed into the at least one storage block, releasing the at least one cache page and unlocking the stripe to enable a further operation for the stripe.

In addition, or as an alternative, in some embodiments, the method 900 may further comprise: in response to receiving a fourth indication that the flushing of the to-be-written data to the at least one storage block fails, re-flushing the to-be-written data in the at least one cache page marked as to-be-flushed into the at least one storage block.

In addition, or as an alternative, in some embodiments, the method 900 may further comprise: in response to receiving a first signal indicating a power failure, writing the at least one cache page in the persistent memory into a standby disk; in response to receiving a second signal indicating recovery of the power failure, re-loading the at least one cache page from the standby disk into the persistent memory; and flushing the to-be-written data in the at least one cache page marked as to-be-flushed into the at least one storage block.

Figure 10:
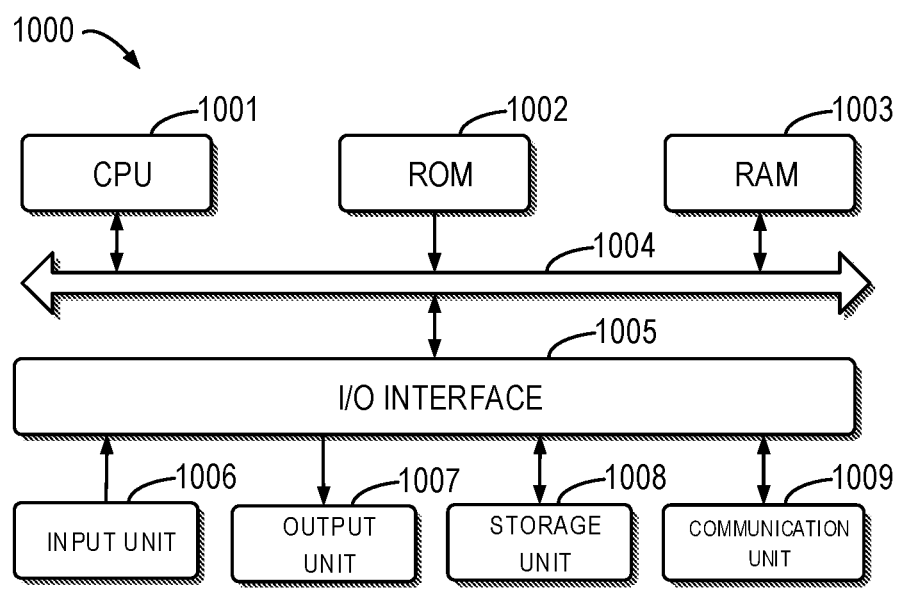
FIG. 10 illustrates a block diagram of an example device 1000 that can be used to implement embodiments of the present disclosure.

FIG. 10 illustrates a block diagram of an example device 1000 adapted to implement an embodiment of the present disclosure. For example, the cache component 210 and/or the disk array 230 shown in FIG. 2 may be implemented by the device 1000. As shown in the figure, the device 1000 comprises a central processing unit (CPU) 1001 that may perform various appropriate actions and processing based on computer program instructions stored on a read-only memory (ROM) 1002 or computer program instructions loaded from a memory unit 1008 to a random access memory (RAM) 1003. In the RAM 1003, various programs and data needed for operations of the device 1000 may be further stored. The CPU 1001, ROM 1002 and RAM 1003 are connected to each other via a bus 1004. An input/output (I/O) interface 1005 is also connected to the bus 1004.

Various components in the device 1000 are connected to the I/O interface 1005, including: an input unit 1006 such as a keyboard, a mouse and the like; an output unit 1007 including e.g. various kinds of display and loudspeaker, etc.; a memory unit 1008 including e.g. a magnetic disk, an optical disk, etc.; and a communication unit 1009 including e.g. a network card, a modem, and a wireless communication transceiver, etc. The communication unit 1009 allows the device 1000 to exchange information/data with other devices over a computer network, such as the Internet and/or various kinds of telecommunications networks.

Various processes and processing described above, e.g., method 800 and/or 900, may be executed by the processing unit 1001. For example, in some embodiments, the method 800 and/or 900 may be implemented as a computer software program that is tangibly embodied on a machine readable medium, e.g., the storage unit 1008. In some embodiments, part or all of the computer program may be loaded and/or mounted onto the device 1000 via ROM 1002 and/or communication unit 1009. When the computer program is loaded onto the RAM 1003 and executed by the CPU 1001, one or more acts of the at least one of the method 800 and/or 900 as described above may be executed.

The present disclosure may be a method, apparatus, system and/or computer program product. The computer program product may include a computer readable medium on which computer readable program instructions for executing various aspects of the present disclosure are embodied.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. The computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including object oriented programming languages such as Smalltalk, C++ or the like, and conventional procedural programming languages such as the "C" language or similar programming languages. The computer readable program instructions may be executed entirely on the user's computer, executed partly on the user's computer, executed as a stand-alone software package, executed partly on the user's computer and partly on a remote computer, or executed entirely on the remote computer or server. In the scenario with respect to the remote computer, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processing unit of a general purpose computer, special purpose computer, or other programmable data processing apparatus to produce a machine, such that the instructions, when executed via the processor of the computer or other programmable data processing apparatuses, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device so as to cause a series of operational steps to be performed on the computer, other programmable apparatus or other device to produce a computer implemented process, such that the instructions executed on the computer, other programmable apparatus, or other device implement the functions/actions specified in the flowchart and/or block diagram block or blocks.

The flowcharts and block diagrams in the Figures illustrate the architecture, functionality, and operation of possible implementations of systems, methods and computer program products according to a plurality of embodiments of the present invention. In this regard, each block in the flowcharts or block diagrams may represent a module, segment, or portion of code, which contain one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functions involved. It will also be noted that, each block of the block diagrams and/or flowcharts and combinations of blocks in the block diagrams and/or flowcharts can be implemented by special purpose hardware-based systems that perform the specified functions or acts, or by combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method (800) of writing data in a disk array (230) in a storage system (200), the method (800) comprising:
    in response to receiving a write request to write new data to a data block in a disk array group (231-1) in a degraded mode within the disk array (230), reading (810) old data stored in the data block and old parity information stored in a parity block associated with the data block, the storage system (200) including a cache component (210) having a persistent memory (220), a cache page being allocated in the persistent memory (220), and a storage disk of the disk array group (231-1) including an independent journal space used to ensure data consistency upon performing a read/write operation with respect to the disk array group (231-1);
    determining (820) new parity information associated with the new data based on the old data, the old parity information, and the new data;
    determining that the disk array group (231-1) is in the degraded mode within the disk array (230);
    in response to determining that the disk array group (231-1) is in the degraded mode:
        replacing the independent journal space included in the storage disk with the cache page allocated in the persistent memory (220); and
        writing (830) the new data and the new parity information into the cache page; and
    flushing (840) the new data and the new parity information into the data block and the parity block in the disk array group (231-1), respectively;

wherein writing the new data and the new parity information into the cache page comprises:

sending, from the disk array group (231-1) in the degraded mode, a first request to the cache component (210) to allocate the cache page in the persistent memory (220);

in response to receiving first information about the cache page from the cache component (210), writing, by the disk array group (231-1) in the degraded mode, the new data and the new parity information to the cache page, wherein the first information about the cache page comprises a data structure recording an address of the cache page; and in response to completion of the writing to the cache page, sending, from the disk array group (231-1) in the degraded mode, a first indication of the completion of the writing to the cache component (210).

2. The method (800) according to claim 1, wherein the data block and the parity block are included in a stripe in the disk array group (231-1), the first request instructing the cache component (210) to lock the stripe to prevent a further operation for the stripe, and the first request further instructing the cache component (210) to mark the cache page as to-be-flushed upon receiving the first indication.

3. The method (800) according to claim 2, wherein writing the new data and the new parity information into the data block and the parity block respectively comprises:

in response to receiving, at the disk array group (231-1) in the degraded mode from the cache component (210), a second indication that the new data and the new parity information can be flushed to the disk array group (231-1), sending, from the disk array group (231-1) in the degraded mode to the cache component (210) a second request to flush the new data and the new parity information;

in response to receiving from the cache component (210) a write- through request for the new data and the new parity information, flushing the new data and the new parity information to the data block and the parity block, respectively; and in response to completion of the flushing to the data block and the parity block, sending, from the disk array group (231-1) in the degraded mode, a third indication of the completion of the flushing to the cache component (210).

4. The method (800) according to claim 3, wherein the write-through request comprises second information of the cache page marked by the cache component (210) as to-be-flushed.

5. The method (800) according to claim 3, wherein the second request instructs the cache component (210) to release the cache page and unlock the stripe upon receiving the third indication so as to enable a further operation for the stripe.

6. The method according to claim 2, wherein flushing (840) includes:

scanning (710, 720), by the cache component (210), the persistent memory (220) in the cache component (210) for cache pages that are marked as to-be-flushed;

determining (730), by the cache component (210), a set of dirty cache pages that are associated with the stripe;

flushing (740), by the cache component (210), all dirty cache pages of the set into the stripe in the disk array group 231-1 simultaneously; and in response to flushing all the dirty cache pages of the set, removing (750), by the cache component (210), the to-be-flushed marks from the dirty cache pages of the set.

7. A disk array (230) comprised in a storage system (200), the disk array (230) comprising:

at least one processing unit;

at least one memory coupled to the at least one processing unit and storing instructions executable by the at least one processing unit, the instructions, when executed by the at least one processing unit, causing a device to perform acts comprising:

in response to receiving a write request to write new data to a data block in a disk array group (231-1) in a degraded mode within the disk array (230), reading old data stored in the data block and old parity information stored in a parity block associated with the data block, the storage system (200) including a cache component (210) having a persistent memory (220), a cache page being allocated in the persistent memory (220), and a storage disk of the disk array group (231-1) including an independent journal space used to ensure data consistency upon performing a read/write operation with respect to the disk array group (231-1);

determining new parity information associated with the new data based on the old data, the old parity information, and the new data;

determining that the disk array group (231-1) is in the degraded mode within the disk array (230);

in response to determining that the disk array group (231-1) is in the degraded mode:

replacing the independent journal space included in the storage disk with the cache page allocated in the persistent memory (220); and writing the new data and the new parity information into the cache page; and flushing the new data and the new parity information into the data block and the parity block in the disk array group (231-1), respectively;

wherein writing the new data and the new parity information into the cache page comprises:

sending, from the disk array group (231-1) in the degraded mode, a first request to the cache component (210) to allocate the cache page in the persistent memory (220);

in response to receiving first information about the cache page from the cache component (210), writing, by the disk array group (231-1) in the degraded mode, the new data and the new parity information to the cache page, wherein the first information about the cache page comprises a data structure recording an address of the cache page; and in response to completion of the writing to the cache page, sending, from the disk array group (231-1) in the degraded mode, a first indication of the completion of the writing to the cache component (210).

8. The disk array (230) according to claim 7, wherein the data block and the parity block are included in a stripe in the disk array group (231-1), the first request instructing the cache component (210) to lock the stripe to prevent a further operation for the stripe, and the first request further instructing the cache component (210) to mark the cache page as to-be-flushed upon receiving the first indication.

9. The disk array (230) according to claim 8, wherein writing the new data and the new parity information into the data block and the parity block respectively comprises:

in response to receiving, at the disk array group (231-1) in the degraded mode from the cache component (210), a second indication that the new data and the new parity information can be flushed to the disk array group (231-1), sending, from the disk array group (231-1) in the degraded mode to the cache component (210) a second request to flush the new data and the new parity information;

in response to receiving from the cache component (210) a write- through request for the new data and the new parity information, flushing the new data and the new parity information into the data block and the parity block, respectively; and in response to completion of the flushing to the data block and the parity block, sending, from the disk array group (231-1) in the degraded mode, a third indication about the completion of the flushing to the cache component (210).

10. The disk array (230) according to claim 9, wherein the write-through request comprises second information about the cache page marked by the cache component (210) as to-be-flushed.

11. The disk array (230) according to claim 9, wherein the second request instructs the cache component (210) to release the cache page and unlock the stripe upon receiving the third indication so as to enable a further operation for the stripe.

12. A storage system (200), comprising:
a disk array group (231-1) within a disk array (230), wherein a storage disk of the disk array group (231-1) includes an independent journal space for use in ensuring data consistency upon performing a read/write operation with respect to the disk array group (231-1);
a cache component (210) including a persistent memory (220), wherein a cache page is allocated in the persistent memory (220);
at least one memory; and
at least one processing unit configured to execute program instructions out of the at least one memory to:
in response to receiving a write request to write new data to a data block in the disk array group (231-1) within the disk array (230), read (810) old data stored in the data block and old parity information stored in a parity block associated with the data block;
determine (820) new parity information associated with the new data based on the old data, the old parity information, and the new data;
determine that the disk array group (231-1) is in a degraded mode within the disk array (230);
in response to determining that the disk array group (231-1) is in the degraded mode:
replace the independent journal space included in the storage disk of the disk array group (231-1) with the cache page allocated in the persistent memory (220); and
write (830) the new data and the new parity information into the cache page; and
flush (840) the new data and the new parity information into the data block and the parity block in the disk array group (231-1), respectively.

\* \* \* \* \*